(12) United States Patent
Tsuruda et al.

(10) Patent No.: US 10,847,830 B2
(45) Date of Patent: Nov. 24, 2020

(54) CONDUCTING MEMBER FOR FUEL CELLS, FUEL CELL, FUEL CELL STACK, AND METHOD OF PRODUCING CONDUCTING MEMBER FOR FUEL CELLS

(71) Applicant: TOYO KOHAN CO., LTD., Tokyo (JP)

(72) Inventors: Tomoyuki Tsuruda, Yamaguchi (JP); Takahiro Yoshida, Yamaguchi (JP); Kazumasa Shimata, Yamaguchi (JP)

(73) Assignee: TOYO KOHAN CO., LTD., Tokyo (JP)

( * ) Notice: Subject to any disclaimer, the term of this patent is extended or adjusted under 35 U.S.C. 154(b) by 109 days.

(21) Appl. No.: 15/742,749

(22) PCT Filed: Jun. 16, 2016

(86) PCT No.: PCT/JP2016/067991
§ 371 (c)(1),
(2) Date: Jan. 8, 2018

(87) PCT Pub. No.: WO2017/006741
PCT Pub. Date: Jan. 12, 2017

(65) Prior Publication Data
US 2018/0198152 A1 Jul. 12, 2018

(30) Foreign Application Priority Data
Jul. 9, 2015 (JP) .................................. 2015-137837

(51) Int. Cl.
*H01M 8/24* (2016.01)
*H01M 8/2425* (2016.01)
(Continued)

(52) U.S. Cl.
CPC ....... *H01M 8/2425* (2013.01); *C23C 18/1651* (2013.01); *C23C 18/1689* (2013.01);
(Continued)

(58) Field of Classification Search
CPC ........ H01M 8/2425; H01M 8/02; H01M 8/12; H01M 4/86
See application file for complete search history.

(56) References Cited

U.S. PATENT DOCUMENTS

| | | | | |
|---|---|---|---|---|
| 2003/0068523 | A1* | 4/2003 | Kaneta | ................ B32B 15/018 428/670 |
| 2003/0162077 | A1* | 8/2003 | Ohtani | ............... H01M 8/0206 72/340 |

(Continued)

FOREIGN PATENT DOCUMENTS

| | | |
|---|---|---|
| CN | 104428934 A | 3/2015 |
| JP | H06-264283 A | 9/1994 |

(Continued)

OTHER PUBLICATIONS

An Office Action in corresponding JP Application No. 2015-137837 dated May 7, 2019 is attached with English Translation, 7 pages.
(Continued)

*Primary Examiner* — Kenneth J Douyette
(74) *Attorney, Agent, or Firm* — Muncy, Geissler, Olds & Lowe, P.C.

(57) ABSTRACT

Provided are conducting members for fuel cells obtained by applying a protective film forming agent to a surface-treated base material having a base material and at least one alloy plating layer formed on the base material in order to form a protective film on the alloy plating layer, and thereafter subjecting the surface-treated base material to an acid treatment. In the conducting members for fuel cells of the present invention, the protective film forming agent preferably contains a mixture of a compound having a thiol group and an azole-based compound, and/or an azole-based compound having a thiol group. In the conducting members for fuel
(Continued)

cells of the present invention, the acid treatment is preferably a treatment using sulfuric acid or nitric acid.

10 Claims, 12 Drawing Sheets

(51) Int. Cl.
| | |
|---|---|
| H01M 8/12 | (2016.01) |
| H01M 4/86 | (2006.01) |
| C23C 22/50 | (2006.01) |
| C23C 22/56 | (2006.01) |
| H01M 8/0202 | (2016.01) |
| H01M 8/10 | (2016.01) |
| C23C 22/58 | (2006.01) |
| C23C 18/54 | (2006.01) |
| C23C 18/16 | (2006.01) |
| H01M 8/0208 | (2016.01) |
| C23F 11/14 | (2006.01) |
| C23F 11/16 | (2006.01) |
| H01M 8/021 | (2016.01) |
| C23F 11/10 | (2006.01) |
| C23C 22/52 | (2006.01) |
| C23C 18/42 | (2006.01) |
| C23F 11/00 | (2006.01) |
| C23C 18/44 | (2006.01) |
| C23C 18/50 | (2006.01) |

(52) U.S. Cl.
CPC .............. *C23C 18/42* (2013.01); *C23C 18/54* (2013.01); *C23C 22/50* (2013.01); *C23C 22/52* (2013.01); *C23C 22/56* (2013.01); *C23C 22/58* (2013.01); *C23F 11/00* (2013.01); *C23F 11/10* (2013.01); *C23F 11/149* (2013.01); *C23F 11/161* (2013.01); *C23F 11/165* (2013.01); *H01M 4/86* (2013.01); *H01M 8/021* (2013.01); *H01M 8/0202* (2013.01); *H01M 8/0208* (2013.01); *H01M 8/10* (2013.01); *H01M 8/12* (2013.01); *C23C 18/44* (2013.01); *C23C 18/50* (2013.01); *H01M 2004/8684* (2013.01); *H01M 2004/8689* (2013.01); *Y02P 70/56* (2015.11)

(56) References Cited

U.S. PATENT DOCUMENTS

| | | | |
|---|---|---|---|
| 2005/0089742 A1* | 4/2005 | Ishigami | ............. H01M 8/0206 29/825 |
| 2009/0297913 A1 | 12/2009 | Zhang et al. | |
| 2014/0308602 A1 | 10/2014 | Nishikawa et al. | |
| 2015/0125777 A1 | 5/2015 | Mukai | |

FOREIGN PATENT DOCUMENTS

| | | | | |
|---|---|---|---|---|
| JP | 2001-068129 A | 3/2001 | | |
| JP | 2001-351642 A | 12/2001 | | |
| JP | 2003-105564 A | 4/2003 | | |
| JP | 2004-265695 A | 9/2004 | | |
| JP | 2010-129533 A | 6/2010 | | |
| JP | 2015-067853 A | 4/2015 | | |
| WO | WO 2014-010663 A1 * | 1/2014 | ............ | H01M 8/021 |
| WO | WO 2012/053431 A | 2/2014 | | |

OTHER PUBLICATIONS

European Search Report based on Application No. 16821211 dated Feb. 12, 2019.

* cited by examiner

CONDUCTING MEMBER FOR FUEL CELLS, FUEL CELL, FUEL CELL STACK, AND METHOD OF PRODUCING CONDUCTING MEMBER FOR FUEL CELLS

TECHNICAL FIELD

The present invention relates to a conducting member for fuel cells, a fuel cell, a fuel cell stack, and a method of producing a conducting member for fuel cells.

BACKGROUND ART

In a fuel cell that constitutes a fuel cell stack, conducting members such as a current-collecting plate for fuel cells and a separator for fuel cells are used as a member that collects generated electricity. The current-collecting plate for fuel cells is a member provided on each of both the ends of the fuel cell that constitutes a fuel cell stack, and leading a current from the fuel cell stack. The separator for fuel cells is used as a member of the fuel cell that constitutes a fuel cell stack, and has a function to supply an electrode with fuel gas or air through gas flow channels and a function to collect electrons generated at the electrode. Conventionally, as such a conducting member for fuel cells, there has been used a separator for fuel cells configured such that a carbon plate is formed with gas flow channels.

When a carbon plate is used as a material that constitutes a separator for fuel cells, however, there are problems in that the material cost and working cost increase, and a gas barrier property and strength become insufficient. It is therefore required to substitute the carbon plate with a metal, such as stainless steel, aluminum, or titanium alloy, which can reduce the material cost and can be inexpensively formed with gas flow channels by means of high speed press working.

In this regard, Patent Document 1 discloses a separator for fuel cells configured such that a metallic base material is used as a mother material of the separator for fuel cells and a metal layer made of a predetermined metal and a gold plated layer are formed on the base material by means of electrolytic plating.

PRIOR ART DOCUMENT

Patent Document

[Patent Document 1] JP 2001-351642 A

SUMMARY OF INVENTION

Problems to be Solved by Invention

However, in the separator for fuel cells disclosed in Patent Document 1 described above, minute defects such as pinholes may exist in the gold plated layer and the metal layer. Such pinholes may cause the metal layer and the base material to be partially exposed. When such a separator for fuel cells is used as a member of a fuel cell used in a high-temperature acidic atmosphere, there are problems in that components that form the base material and the metal layer may be eluted in large amounts from the pinholes, which causes deterioration in fuel cell performance. Similarly, even in a case in which the configuration of the separator for fuel cells disclosed in Patent Document 1 described above, i.e., the configuration by forming the metal layer made of a predetermined metal and the gold plated layer on the base material is applied to the current-collecting plate for fuel cells, there is a problem in that the corrosion resistance of a portion in which pinholes occur in the current-collecting plate for fuel cell may be deteriorated, which causes deterioration in fuel cell performance.

It is an object of the present invention to provide a conducting member for fuel cells effectively suppressing the elution of a base material and a metal layer and having excellent corrosion resistance.

The present inventors found that the object described above can be achieved by applying a protective film forming agent to a surface-treated base material including a base material and at least one alloy plating layer formed on the base material, to form a protective film, and thereafter subjecting the surface-treated base material to an acid treatment. Thus, the present inventors completed the invention.

That is, according to the invention, there is provided a conducting member for fuel cells obtained by applying a protective film forming agent to a surface-treated base material having a base material and at least one alloy plating layer formed on the base material in order to form a protective film on the alloy plating layer, and thereafter subjecting the surface-treated base material to an acid treatment.

In regard to the present invention, it is preferable that the protective film forming agent contains a mixture of a compound having a thiol group and an azole-based compound, and/or an azole-based compound having a thiol group.

In regard to the present invention, it is preferable that the acid treatment is a treatment using sulfuric acid or nitric acid.

In regard to the present invention, it is preferable that the conducting member for fuel cells further includes a gold plated layer provided on the alloy plating layer.

In regard to the present invention, it is preferable that the base material is made of a stainless steel material or an aluminum material.

In regard to the present invention, it is preferable that the conducting member for fuel cells is a separator for fuel cells or a current-collecting plate for fuel cells.

According to the invention, there is provided a fuel cell including the conducting member for fuel cells.

According to the invention, there is provided a fuel cell stack obtained by stacking a plurality of fuel cells.

Furthermore, according to the invention, there is provided a method of producing a conducting member for fuel cells, the method including: forming at least one alloy plating layer on a base material; subjecting the base material on which the alloy plating layer is formed, to a protective film forming treatment using a protective film forming agent; and subjecting the base material subjected to the protective film forming treatment, to an acid treatment.

According to the invention, there is provided a method of producing a conducting member for fuel cells, the method including: forming at least one alloy plating layer on a base material; forming a gold plated layer on the alloy plating layer; subjecting the base material on which the alloy plating layer and the gold plated layer are formed, to a protective film forming treatment using a protective film forming agent; and subjecting the base material subjected to the protective film forming treatment, to an acid treatment.

According to the invention, there is provided a conducting member for fuel cells including a base material and an alloy plating layer formed on the base material, wherein the gold plated layer includes a protective film formed on at least a part of an exposed surface of the gold plated layer using a protective film forming agent, and the base material includes a passivation film formed on at least a part of an exposed surface of the base material by means of an acid treatment.

Effect of Invention

According to the invention, there can be provided a conducting member for fuel cells capable of effectively suppressing the elution of a base material and an alloy plating layer, thereby to have excellent corrosion resistance.

MODE(S) FOR CARRYING OUT THE INVENTION

Figure 1:
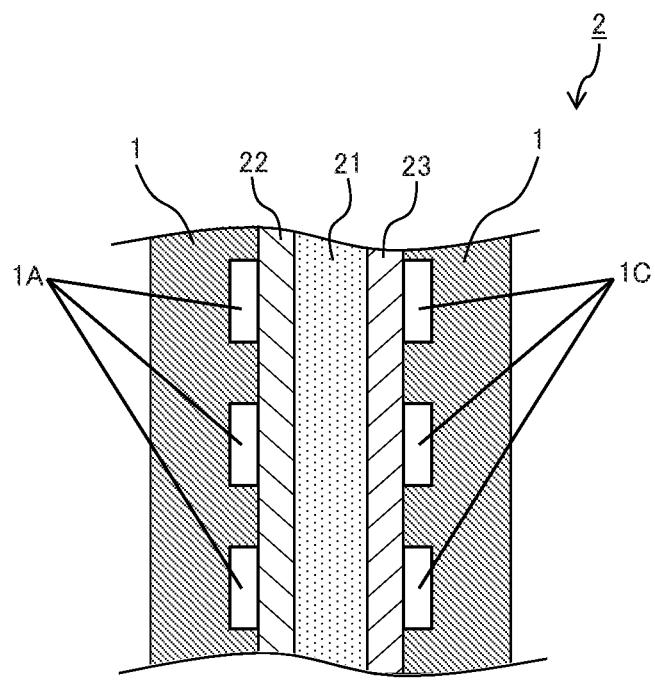
FIG. 1 is a sectional view illustrating a fuel cell including a conducting member for fuel cells according to an embodiment of the present invention (separator)
Figure 2:
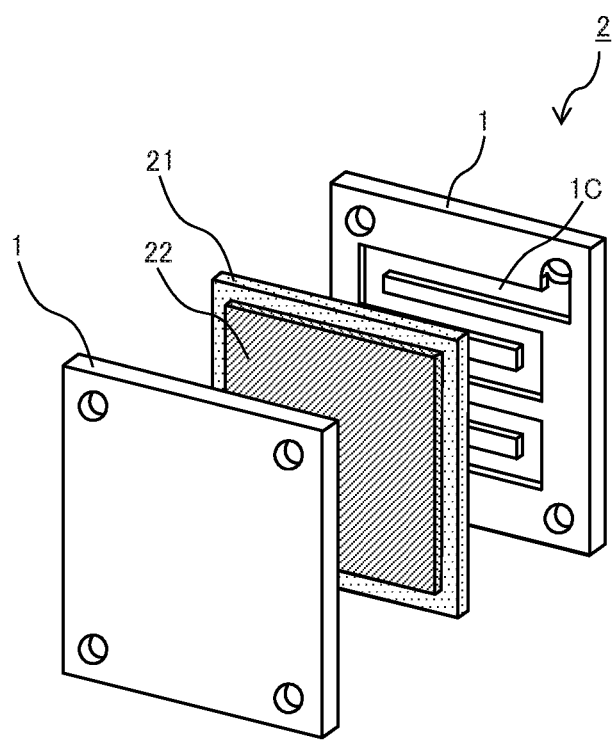
FIG. 2 is an exploded perspective view illustrating the fuel cell of FIG. 1.
Figure 3A:
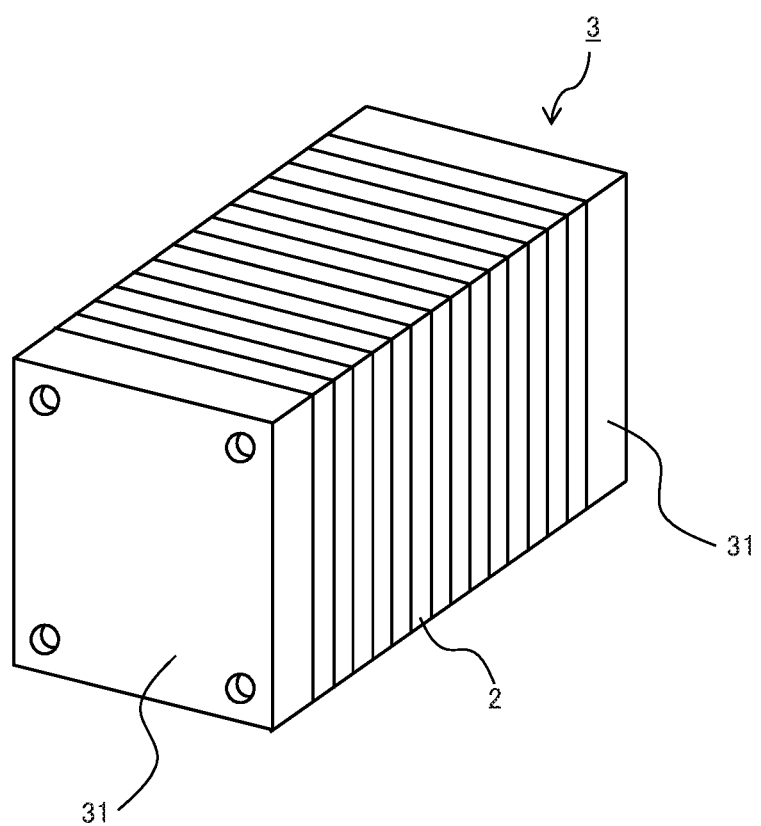
FIG. 3A is a perspective view illustrating a fuel cell stack obtained by stacking the fuel cell of FIGS. 1 and 2, and a conducting member for fuel cells (current-collecting plate)
Figure 3B:
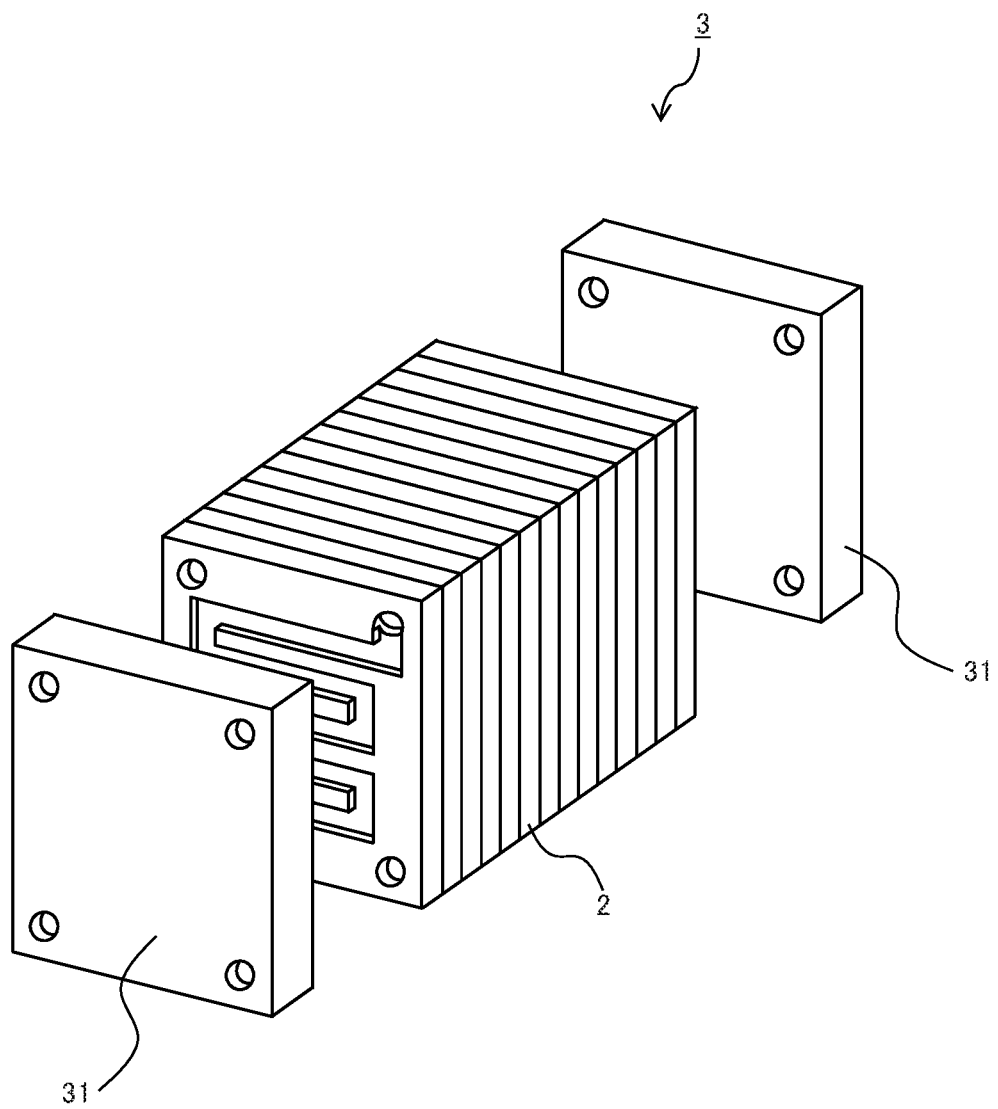
FIG. 3B is an exploded perspective view illustrating the fuel cell stack of FIG. 3A.

First, the configuration of a solid polymer electrolyte fuel cell stack including an electrolyte membrane 21 made of a solid polymer will be explained as an example of a fuel cell stack 3 including a conducting member for fuel cells (separator) 1 of the present invention. FIG. 1 is a sectional view illustrating a fuel cell 2 that is a constitutional unit of the fuel cell stack 3. FIG. 2 is an exploded perspective view illustrating the fuel cell 2. FIG. 3A is a perspective view illustrating the fuel cell stack 3 obtained by stacking a plurality of fuel cells 2 each including the conducting member for fuel cells (separator) 1, and a conducting member for fuel cells (current-collecting plate) 31. FIG. 3B is an exploded perspective view illustrating the fuel cell stack 3.

The fuel cell 2 of the present embodiment includes the electrolyte membrane 21, an anode 22, a cathode 23, and the conducting members for fuel cells (separators) 1, 1, as illustrated in FIG. 1. The anode 22 and the cathode 23 are gas diffusion electrodes and are arranged across the electrolyte membrane 21 to form a sandwich-like structure. The conducting members for fuel cells (separators) 1, 1 are arranged across this sandwich-like structure, respectively supply fuel gas and oxidizing gas to the anode 22 and the cathode 23, and collect electric power provided by an electrochemical reaction. Therefore, a flow channel for fuel gas 1A is formed between the anode 22 and the conducting member for fuel cells (separator) 1, and a flow channel for oxidizing gas 1C is formed between the cathode 23 and the conducting member for fuel cells (separator) 1.

When the fuel cell stack 3 is actually assembled, a predetermined number of fuel cells 2 are stacked as illustrated in FIGS. 3A and 3B, and the conducting members for fuel cells (current-collecting plates) 31 are arranged across the predetermined number of stacked fuel cells. Hydrogen-containing fuel gas is supplied to the anode 22 of the fuel cell 2, and oxygen-containing oxidizing gas is supplied to the cathode 23 to cause an electrochemical reaction to proceed in the anode 22 and the cathode 23. Electric power provided by the electrochemical reaction is further collected by the conducting member for fuel cells (current-collecting plate) 31 while the electric power is collected by the conducting members for fuel cells (separators) 1, 1 described above. Therefore, the conducting members for fuel cells (separators) 1, 1 and the conducting member for fuel cells (current-collecting plates) 31 are members requiring conductivity. The conducting member for fuel cells of the present invention can be used for the conducting member for fuel cells (separator) 1 and the conducting member for fuel cells (current-collecting plate) 31 or the like.

Next, the conducting member for fuel cells of the present embodiment will be explained. The conducting member for fuel cells of the present embodiment can be applied to the conducting member for fuel cells (separator) 1 and the conducting member for fuel cells (current-collecting plate) 31, as described above.

Figure 4:
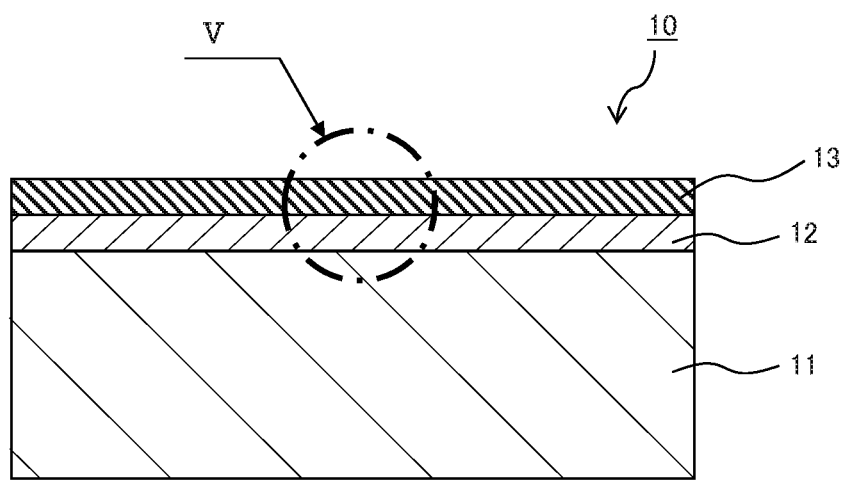
FIG. 4 is a sectional view illustrating an example of a surface-treated base material for forming a conducting member for fuel cells of the present invention.

The conducting member for fuel cells of the present embodiment is formed by subjecting a surface-treated base material 10 having a configuration as illustrated in FIG. 4 to a protective film forming treatment using a protective film forming agent and an acid treatment that will be described below in this order.

The surface-treated base material 10 is obtained by forming a gold plated layer 13 as an outermost layer on an alloy plating layer 12 formed on a base material 11, for example, as illustrated in FIG. 4. Although an example in which the outermost layer of the surface-treated base material 10 is the gold plated layer 13 is illustrated in FIG. 4, the gold plated layer 13 may not be formed on the surface-treated base material 10 when sufficient corrosion resistance and conductivity can be secured without forming the gold plated layer 13. In this case, the alloy plating layer 12 constitutes the outermost layer of the surface-treated base material 10. Hereinafter, respective layers constituting the surface-treated base material 10 will be explained.

<Base Material 11>

The base material 11 is not particularly limited. Examples of the base material 11 capable of being used without particular limitation include steel, stainless steel, Al, Al alloy, Ti, Ti alloy, Cu, Cu alloy, Ni, and Ni alloy.

The thickness of the base material 11 is not particularly limited, and preferably 0.05 to 2.0 mm, and more preferably 0.1 to 0.3 mm.

When the base material 11 of the present embodiment is used in the application of a separator for fuel cells, it is preferable that the surface of the base material 11 to be used is preliminarily formed with irregularities (gas flow channels) that function as flow channels for fuel gas or air. Examples of the method of forming such gas flow channels include, but are not particularly limited to, a method of forming the gas flow channels by press working.

When the base material 11 of the present embodiment is used in the application of the current-collecting plate for fuel cells, examples of the method include a method of forming the base material 11 as a flat plate in a predetermined shape in accordance with press working.

<Alloy Plating Layer 12>

The alloy plating layer 12 is a layer formed on the surface of the base material 11. As illustrated in FIG. 4, when the gold plated layer 13 is formed on the alloy plating layer 12, the alloy plating layer 12 is a layer acting as an underlying layer for satisfactorily forming the gold plated layer 13. Alternatively, when the gold plated layer 13 is not formed, the alloy plating layer 12 is a layer constituting the outermost layer of the conducting member for fuel cells. One alloy plating layer 12 may be provided, or two or more alloy plating layers 12 may also be provided. When two or more alloy plating layers 12 are provided, components that constitute respective layers may be or may not be the same.

Examples of the components that constitute the alloy plating layer 12 include at least one element selected from Ni, Fe, Co, Cu, Zn, Sn, Pd, Re, Pt, Rh, Ag, and Ru, and compounds of the elements and P or B. These elements that constitute the alloy plating layer 12 may be contained singly or in combination of two or more. Examples thereof include alloys such as Ni—Pd—P, Ni—P, Pd—P, and Ni—Sn alloys. Particularly, Pd—P and Ni—Pd—P alloys are preferable. The alloy plating layer 12 is preferably made of Ni—Pd—P alloy that contains Ni, Pd, and P in view of causing a protective film forming agent that will be described below to be likely to adhere to the alloy plating layer 12, thereby to allow a protective film to be satisfactorily formed.

When the alloy plating layer 12 is formed from Ni—Pd—P alloy, the molar ratio of Ni to Pd (Ni/Pd) is preferably 0.005 to 0.5. When the molar ratio between Pd and Ni that constitute the alloy plating layer 12 is adjusted to the range described above, the alloy plating layer 12 can be satisfactorily formed on the base material 11. When the gold plated layer 13 is formed on the alloy plating layer 12, the gold plated layer 13 can be satisfactorily formed.

Examples of the method of forming the alloy plating layer 12 made of Ni—Pd—P alloy include a method of plating the base material 11 using a plating bath obtained by mixing a nickel plating bath and a palladium plating bath which are ordinarily used. Examples of the nickel plating bath include a plating bath that contains: a nickel salt such as nickel chloride, nickel sulfate, nickel nitrate or nickel acetate; a phosphorus-containing reducing agent such as hypophosphite; and a complexing agent such as citric acid. Examples of the palladium plating bath include a plating bath that contains: a palladium salt such as palladium chloride; a phosphorus-containing reducing agent such as hypophosphite and phosphite; and a complexing agent such as thiodiglycolic acid. Meanwhile, on the occasion of producing an underlying alloy electroless plating bath by mixing a nickel plating bath and a palladium plating bath, it is preferable to use nickel sulfate as the nickel salt, and to use palladium chloride as the palladium salt. The mixing ratio between the nickel plating bath and the palladium plating bath may be appropriately set in accordance with the ratios of the respective elements of the Ni—Pd—P alloy that constitutes the alloy plating layer 12. In the above description, the case in which the alloy plating layer 12 is formed from Ni—Pd—P alloy has been illustrated as an example. However, even in a case in which the alloy plating layer 12 is formed from other elements, similarly, a plating bath obtained by appropriately preparing a plating bath that contains the respective elements that constitute the alloy plating layer 12 and has a reducing agent and a complexing agent added thereto, may be used.

Meanwhile, it is preferable that the alloy plating layer 12 is formed using the plating bath described above, under the conditions of a pH of 4.0 to 7.0, a bath temperature of 30° C. to 50° C., and an immersion time of 5 to 20 minutes.

The thickness of the alloy plating layer 12 is preferably 0.001 to 1.0 μm, and more preferably 0.01 to 0.2 μm. When the thickness of the alloy plating layer 12 is adjusted to the range described above, the gold plated layer 13 can be satisfactorily formed on the alloy plating layer 12. A protective film forming treatment using a protective film forming agent and an acid treatment that will be described below are performed in the present embodiment, so that, even in a case in which the alloy plating layer 12 is thinned in this manner, the elution of the components that constitute the base material 11 from pinholes caused by the thinning can be suitably suppressed. That is, the elution of the components from the base material 11 serving as a lower layer can be suitably prevented while the thinning of the alloy plating layer 12 is allowed.

Here, when the base material 11 for forming the alloy plating layer 12 is preliminarily formed with gas flow channels by means of press working or the like, as described above, cracks in the alloy plating layer 12 of the separator for fuel cells to be obtained can be effectively prevent. That is, the use of the base material 11 preliminarily formed with the gas flow channels eliminates the need for press working or the like for forming the gas flow channels, or the like after the alloy plating layer 12 is formed, so that the occurrence of the cracks of the alloy plating layer 12 caused by pressure such as press working can be prevented.

According to the present embodiment, when the alloy plating layer 12 is formed on the base material 11, the alloy plating layer 12 may be formed directly on the base material 11, but a modifying layer may be provided to enhance the adhesion property between the base material 11 and the alloy plating layer 12. The modifying layer may be appropriately formed in accordance with properties of the base material 11 and the alloy plating layer 12. In view of enhancing the adhesion property with the alloy plating layer 12, the modifying layer is preferably a layer that contains the same element or elements that constitute the alloy plating layer 12. For example, when the alloy plating layer 12 is formed from Ni—Pd—P alloy, the modifying layer is preferably a Ni-based layer. When such a Ni-based layer is formed by means of electroless reduction plating, the Ni-based layer is a Ni—P plate layer. One modifying layer may be provided, or two or more modifying layers may also be provided. When two or more modifying layers are provided, components that constitute respective layers may be or may not be the same. The method of forming the modifying layer is not particularly limited. The modifying layer or layers can be formed by electrolytic plating, electroless plating, and sputtering or the like.

<Gold Plated Layer 13>

The gold plated layer 13 is a layer formed on the alloy plating layer 12 as necessary, and is formed by subjecting the alloy plating layer 12 to a plating treatment. The plating treatment is preferably electroless plating, and examples thereof include an electroless substitution plating treatment and an electroless reduction plating treatment. The gold plated layer 13 may be formed by means of the electroless substitution plating treatment and the electroless reduction plating treatment, for example. In the present embodiment, the gold plated layer 13 can be uniformly formed for an irregular part that constitutes gas flow channels by means of the electroless plating even in a case in which the base material preliminarily formed with gas flow channels is used, as described above.

The thickness of the gold plated layer 13 is preferably 1 to 200 nm, and more preferably is 2 to 100 nm. When the thickness of the gold plated layer 13 is adjusted to the range described above, the gold plated layer 13 can be uniformly formed on the alloy plating layer 12, which can enhance the corrosion resistance and the conductivity of the obtained conducting member for fuel cells. In the present embodiment, a protective film forming treatment using a protective film forming agent and an acid treatment that will be described below are performed. Thereby, even in a case in which the gold plated layer 13 is thinned in this manner, the elution of the components that constitute the base material 11 and the alloy plating layer 12 from pinholes caused by the thinning can be suitably suppressed. That is, the elution of the components from the base material 11 and the alloy plating layer 12 that serve as a lower layer can be suitably prevented while the thinning of the gold plated layer 13 is allowed.

The surface-treated base material 10 of the present embodiment is configured as described above.

Figure 5:
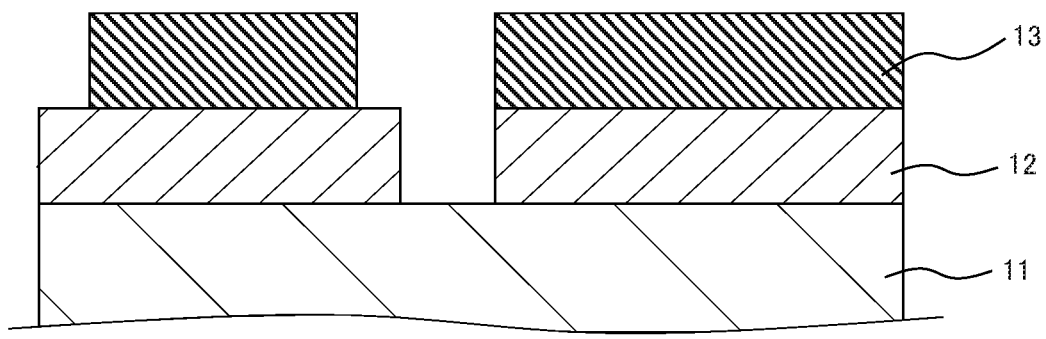
FIG. 5 is an enlarged view of a principal portion shown by V in the surface-treated base material 10 illustrated in FIG. 4.

In the present embodiment, such a surface-treated base material 10 is subjected to a protective film forming treatment using a protective film forming agent, and an acid treatment in this order, thereby to allow the conducting member for fuel cells to be obtained. Hereinafter, with reference to FIG. 5, the treatment using the protective film forming agent and the acid treatment will be explained. FIG. 5 is an enlarged view of a principal portion shown by V in FIG. 4.

Here, in the surface-treated base material 10 illustrated in FIG. 4, pinholes or the like may occur in the gold plated layer 13 and the alloy plating layer 12 as illustrated in FIG. 5. In this case, an exposed part in which the alloy plating layer 12 and the base material 11 are exposed exists. When such an exposed part exists, the components that constitute the alloy plating layer 12 and the base material 11 may be eluted in a high-temperature acidic atmosphere, which may cause deterioration in fuel cell performance when the surface-treated base material 10 is used as the conducting member for fuel cells. In this regard, in order to solve such a problem in the present embodiment, the surface-treated base material 10 illustrated in FIG. 4 is subjected to the protective film forming treatment using the protective film forming agent and the acid treatment in this order.

<Protective Film Forming Treatment Using Protective Film Forming Agent>

Figure 6:
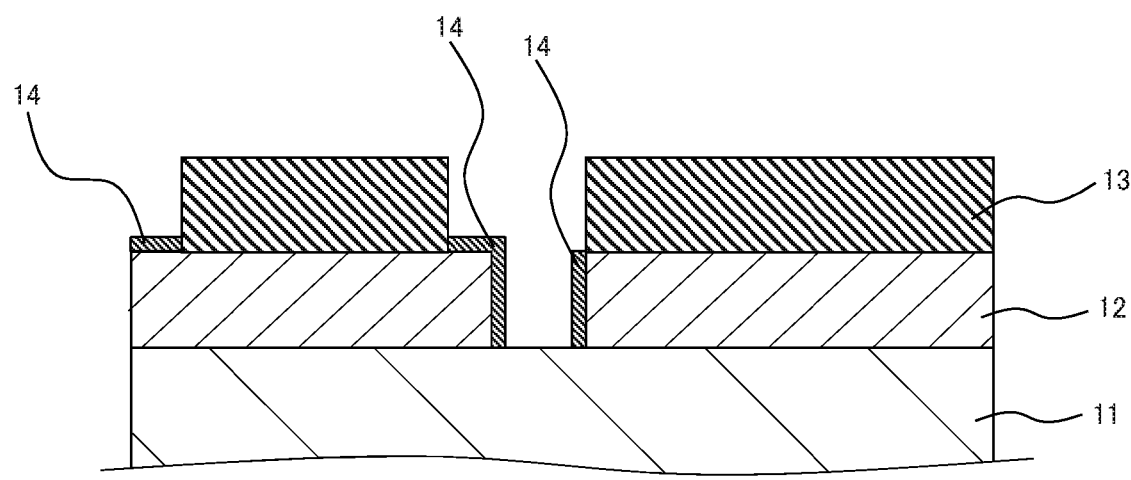
FIG. 6 is an enlarged view of the principal portion shown by V in FIG. 4 when the surface-treated base material 10 illustrated in FIG. 4 is subjected to a protective film forming treatment using a protective film forming agent.

First, the surface-treated base material 10 is treated by the protective film forming agent, thereby to form a protective film 14 on at least a part of a portion in which the alloy plating layer 12 is exposed in the surface-treated base material 10, as illustrated in FIG. 6. That is, as in an enlarged view of a principal portion illustrated in FIG. 6, when the surface-treated base material 10 is treated by the protective film forming agent, the pinholes of the gold plated layer 13, or the like cause the protective film forming agent to adhere to a portion in which the alloy plating layer 12 is exposed in the alloy plating layer 12, thereby to form the protective film 14. In this case, it is preferable that the protective film 14 is formed over substantially the entire exposed portion of the alloy plating layer 12, but the protective film 14 may not be partially formed. Alternatively, when the gold plated layer 13 is not formed on the surface-treated base material 10 of the present embodiment, as described above, the protective film 14 is formed on the surface of the alloy plating layer 12. In this case, it is preferable that the protective film 14 is substantially formed over substantially the entire alloy plating layer 12, but the protective film 14 may not be partially formed.

In the present embodiment, the protective film 14 is formed on the portion which the alloy plating layer 12 is exposed, and thereafter subjected to an acid treatment that will be described below. This can cause the protective film 14 to act as the protective film of the alloy plating layer 12 to the acid treatment when a passivation film is formed on the exposed part of the base material 11. In addition, by forming such a protective film 14, the elution of the alloy plating layer 12 can be effectively suppressed even if the alloy plating layer 12 itself is exposed to a high-temperature acidic atmosphere when the surface-treated base material 10 is used as the conducting member for fuel cells of the fuel cell 2.

Examples of the method of treating the surface-treated base material 10 using the protective film forming agent include a method of immersing the surface-treated base material 10 into the protective film forming agent, and a method of spraying the protective film forming agent to the surface-treated base material 10.

The protective film forming agent may adhere to the alloy plating layer 12, thereby to allow the elution of the alloy plating layer 12 to be suppressed, but it is preferable that the protective film forming agent is less likely to adhere to the base material 11 and the gold plated layer 13, and likely to adhere to the alloy plating layer 12. For example, the protective film forming agent is preferably likely to adhere to Ni when Ni is contained in the alloy plating layer 12. Particularly, the protective film forming agent is preferably likely to adhere to Ni—Pd—P alloy when the alloy plating layer 12 is formed from Ni—Pd—P alloy. Specifically, it is preferable that the protective film forming agent to be used contains a mixture of a compound having a thiol group and an azole-based compound, an azole-based compound having a thiol group, or combination thereof.

Examples of the compound having a thiol group include, but are not particularly limited to, a triazinethiol-based compound, a linear alkanethiol having carbon atoms of 10 or more and 20 or less, a pyridinethiol compound, and a thiophenol-based compound. Examples of the compounds each having a thiol group can be used alone or in combination of two or more kinds.

Examples of the azole-based compound include, but are not particularly limited to, a triazole-based compound, a benzotriazole-based compound, an imidazole-based compound, a thiazole-based compound, and a pyrrole compound. Particularly, a benzotriazole-based compound is preferable. These azole-based compounds can be used alone or in combination of two or more kinds.

Examples of the azole-based compound having a thiol group include, but are not particularly limited to, a mercaptotriazole-based compound, a mercaptothiazole-based compound, and a mercaptobenzothiazole-based compound. These azole-based compounds each having a thiol group can be used alone or in combination of two or more kinds.

The protective film forming agent may further contain a surface-active agent such as a nonionic surface-active agent, and an oil or the like. When these are used, the kind and the amount to be used thereof are not particularly limited. Reference examples of the protective film forming agent are described in Japanese Patent Application Publication No. JP H9-170096 A and JP 2012-172190 A.

In the present embodiment, the use of the protective film forming agent described above causes the protective film forming agent to be more likely to selectively adhere to the alloy plating layer 12 than the base material 11 and the gold plated layer 13, so that the protective film 14 is satisfactorily formed on the alloy plating layer 12. Particularly, when Ni or Ni—Pd—P alloy is contained in the alloy plating layer 12, nitrogen atoms of the azole-based compound (nitrogen-containing five-membered ring compound) contained in the protective film forming agent described above are likely to adhere to Ni or the like of the alloy plating layer 12, so that the protective film 14 is more satisfactorily formed on the alloy plating layer 12. Thereby, deterioration in the treating property of an acid treatment that will be described below and deterioration in the conductivity of the surface of the surface-treated base material 10 caused by the formation of the protective film 14 on the gold plated layer 13 can be suppressed.

In the present embodiment, it is preferable that the protective film forming agent to be used is less likely to adhere to the gold plated layer 13, as a result of which the protective film 14 is less likely to be formed on the surface of the gold plated layer 13. As long as the conductivity of the surface-treated base material 10 is not significantly reduced, the protective film 14 may be formed on the gold plated layer 13. Alternatively, when the protective film 14 has excellent conductivity, the protective film 14 may be formed on the whole surface of the gold plated layer 13.

It is preferable that the protective film forming agent to be used is not decomposed even if the protective film 14 formed from the protective film forming agent is heated up to about 300° C. This enhances the heat resistance of the conducting member for fuel cells when the conducting member for fuel cells on which the protective film 14 is formed is used as a member for the fuel cell 2 or the fuel cell stack 3.

<Acid Treatment>

Figure 7:
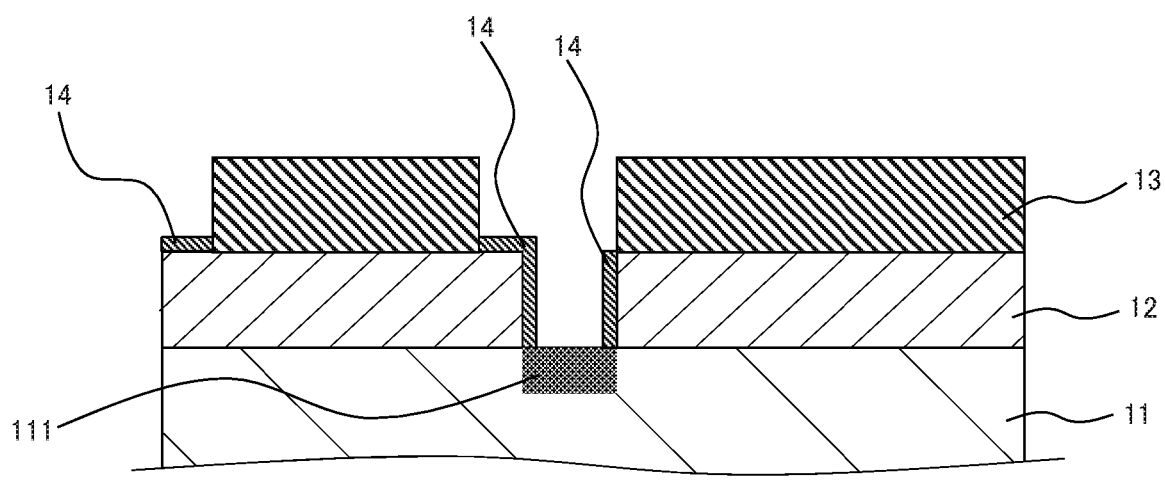
FIG. 7 is an enlarged view of the principal portion shown by V in FIG. 4 when the surface-treated base material 10 illustrated in FIG. 4 is subjected to a protective film forming treatment using a protective film forming agent and an acid treatment.

Next, the above-mentioned surface-treated base material 10 on which the protective film 14 is formed is subjected to an acid treatment. In the present embodiment, by means of the acid treatment, as illustrated in FIG. 7, a passivation film 111 is formed on at least a part of a portion in which the base material 11 is exposed in the surface-treated base material 10 illustrated in FIG. 6. That is, when the pinholes or the like of the alloy plating layer 12 cause a portion in which the base material 11 is exposed on the base material 11 as in an enlarged view of a principal portion illustrated in FIG. 7, the exposed portion is passivated by means of the acid treatment, thereby to form the passivation film 111. In this case, it is preferable that the passivation film 111 is substantially formed on the whole of the exposed portion of the base material 11, but a portion in which the passivation film 111 may not be partially formed.

In the present embodiment, by forming the passivation film 111 on the portion in which the base material 11 is exposed, the elution of the base material 11 can be effectively suppressed even if the surface-treated base material 10 is exposed to a high-temperature acidic atmosphere when the surface-treated base material 10 is used as the fuel cell 2, the conducting member for fuel cells of the fuel cell stack 3 (separator) 1, or the conducting member for fuel cells (current-collecting plate) 31.

Particularly, in the present embodiment, as described above, the protective film 14 is formed on the alloy plating layer 12, and the base material 11 is subjected to the acid treatment in a state where the alloy plating layer 12 is protected by the protective film 14, so that the passivation film 111 can be formed on the base material 11 while the dissolution of the alloy plating layer 12 caused by the acid is suppressed. In the present embodiment, the gold plated layer 13 of the surface-treated base material 10 originally has excellent corrosion resistance against the acid, so that the gold plated layer 13 is not corroded by means of the acid treatment.

Examples of the method of the acid treatment include, but are not particularly limited to, a method of immersing the surface-treated base material 10 subjected to the protective film forming treatment (see FIG. 6) into an acid.

It is preferable that pH is 4 or less during the acid treatment.

The acid used for the acid treatment is not particularly limited, and sulfuric acid and nitric acid are preferably used in view of allowing the passivation film 111 to be satisfactorily formed. Specifically, a sulfuric acid aqueous solution and a nitric acid aqueous solution are preferably used.

When the sulfuric acid aqueous solution is used for the acid treatment, it is preferable that, regarding the conditions of the acid treatment, the concentration of sulfuric acid in the sulfuric acid aqueous solution is 0.01 to 10 wt %; a temperature is 30 to 90° C.; and an immersion time is 10 seconds to 48 hours. It is more preferable that the immersion time is 10 seconds to 24 hours.

When the nitric acid aqueous solution is used for the acid treatment, it is preferable that, regarding the conditions of the acid treatment in the nitric acid aqueous solution, the concentration of nitric acid is 0.01 to 5 wt %; a temperature is 30 to 90° C.; and an immersion time is 10 seconds to 60 minutes.

In the present embodiment, the surface-treated base material 10 in which the alloy plating layer 12 is formed on the base material 11, and the gold plated layer 13 is further formed as necessary is subjected to the treatment using the protective film forming agent and the acid treatment as described above. Thereby, the conducting member for fuel cells applicable to the member for the fuel cell 2 or the fuel cell stack 3, or the like is obtained.

In the conducting member for fuel cells of the present embodiment, the passivation film 111 and the protective film 14 are formed on the pinholes even if the pinholes have occurred in the alloy plating layer 12 or the gold plated layer 13. Therefore, the conducting member for fuel cells of the present embodiment effectively suppresses the elution of the components that form the base material 11 and the alloy plating layer 12 and has excellent corrosion resistance when the conducting member for fuel cells is used as the member for the fuel cell 2 or the fuel cell stack 3.

That is, if the pinholes occur in the alloy plating layer 12 and the gold plated layer 13 of the surface-treated base material in the conventional conducting member for fuel cells as illustrated in FIG. 5, the base material 11 and the alloy plating layer 12 are eluted when the conducting member for fuel cells is used as the member for the fuel cell 2 or the fuel cell stack 3 and exposed to a high-temperature acidic atmosphere. For example, when the base material 11 is made of stainless steel, Fe and Cr or the like are eluted from the base material 11. When the alloy plating layer 12 is formed from Ni—Pd—P alloy or the like, Ni and Pd or the like are eluted from the alloy plating layer 12.

To this end, the passivation film 111 is formed on the portion which the base material 11 is exposed in the base material 11, as illustrated in FIG. 7 in the surface-treated base material 10 of the present embodiment, and the protective film 14 is formed on the portion which the alloy plating layer 12 is exposed in the alloy plating layer 12, so that the elution of the base material 11 and the alloy plating layer 12 is suppressed.

In particular, as described above, in the present embodiment, the protective film forming agent for forming the protective film 14 to be used is less likely to adhere to the base material 11 and the gold plated layer 13, and is likely to adhere to the alloy plating layer 12, thereby to allow the protective film 14 to be selectively formed on the alloy plating layer 12. Therefore, the passivation film 111 is satisfactorily formed on the base material 11 during the acid treatment after the protective film 14 is formed, thereby to allow the obtained conducting member for fuel cells to have significantly excellent corrosion resistance in a high-temperature acidic atmosphere.

That is, the present inventors found that the formation of the passivation film 111 on the exposed part of the base material 11 made of stainless steel or the like according to the acid treatment or the like effectively enhances the corrosion resistance of the exposed part of the base material 11 when being exposed to a high-temperature acidic atmosphere for a long period of time. However, to this end, if the protective film 14 is formed on the base material 11 of the surface-treated base material 10 in the protective film forming treatment using the protective film forming agent, the passivation film 111 is less likely to be formed on the portion in which the protective film 14 is formed in the base material 11, by means of the following acid treatment. Therefore, in the present embodiment, the protective film 14 is selectively formed on not the base material 11 but the alloy plating layer 12, and the passivation film 111 is then formed on the base material 11, so that the corrosion resistance of the obtained conducting member for fuel cells can be further enhanced.

In addition, in the present embodiment, the protective film 14 is selectively formed on the alloy plating layer 12, and the protective film 14 is not formed on the gold plated layer 13, so that the formation of the protective film 14 on the gold plated layer 13 can suppress deterioration in the conductivity of the surface of the surface-treated base material 10.

In the above-described example illustrated in FIG. 7, the gold plated layer 13 is formed on the surface-treated base material 10, but the gold plated layer 13 may not be formed on the surface-treated base material 10 in the present embodiment. In this case, the alloy plating layer 12 is formed on the base material 11 as in the conducting member for fuel cells illustrated in FIG. 8. By the treatment using the protective film forming agent described above, the protective film 14 is formed on the surface of the alloy plating layer 12, and the passivation film 111 is then formed on the base material 11 by means of the acid treatment described above.

In this case, since the protective film 14 is formed on the surface of the alloy plating layer 12, the protective film forming agent to be used preferably provides the protective film 14 having excellent conductivity.

Figure 8:
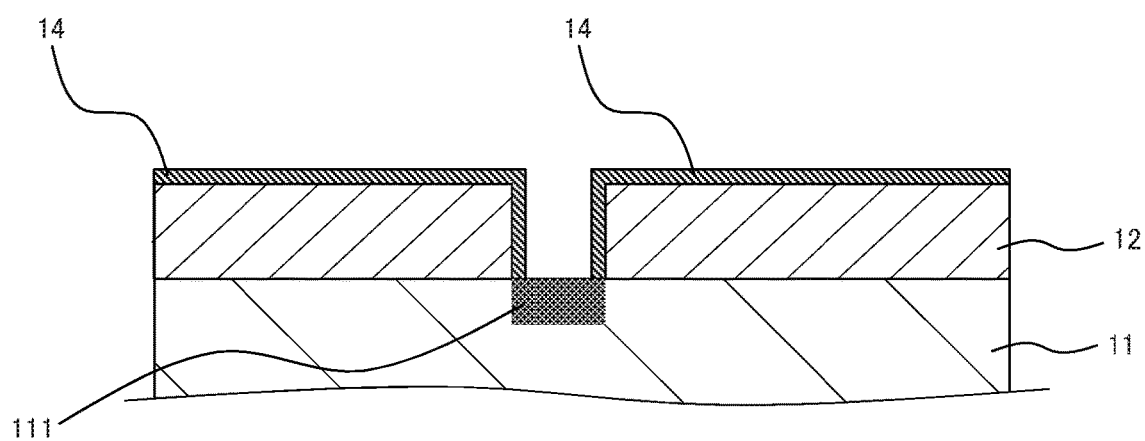
FIG. 8 is a sectional view illustrating a surface-treated base material according to another embodiment of the present invention.
Figure 9:
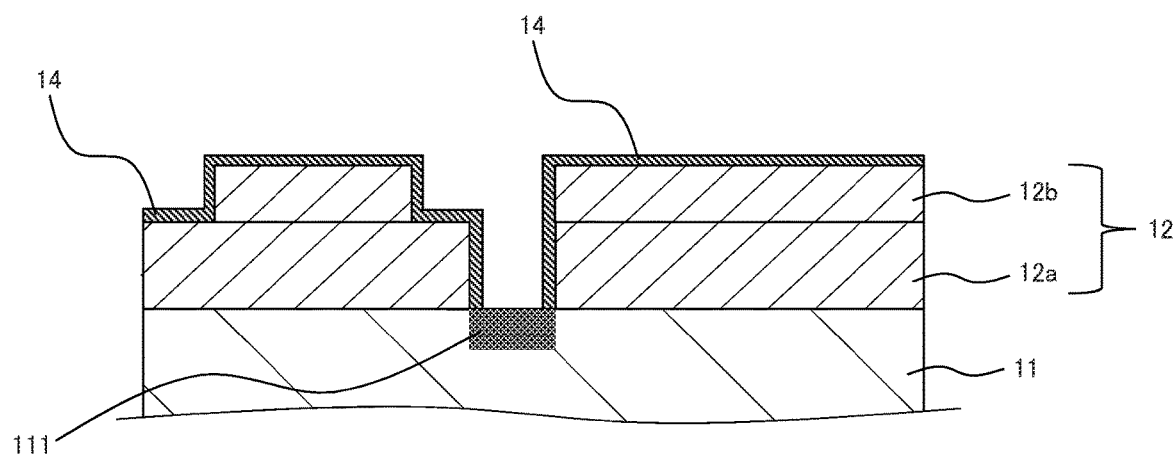
FIG. 9 is a sectional view illustrating a surface-treated base material according to further embodiment of the present invention.

As illustrated in FIG. 8, when only the alloy plating layer 12 is formed on the base material 11, the alloy plating layer 12 preferably has a two-layer structure including a Ni plate layer 12a and a Ni—Sn alloy layer 12b formed in this order as in, for example, the conducting member for fuel cells illustrated in FIG. 9. The alloy plating layer 12 having such a structure allows the conducting member for fuel cells having such a structure to have excellent corrosion resistance and conductivity.

EXAMPLES

Hereinafter, the present invention will be more specifically described with reference to examples, but the present invention is not limited to these examples.

Example 1

First, a stainless steel material (SUS316L) was prepared as a base material 11. Next, the base material 11 prepared was subjected to an electroless plating treatment under the conditions of 38° C. for 4 minutes using a plating bath obtained by mixing a palladium plating bath and a nickel plating bath described below at a proportion of palladium plating bath:nickel plating bath=5.7:1 (volume ratio). Thus, a Ni—Pd—P alloy layer having a thickness of 40 nm was formed as an alloy plating layer 12 on the base material 11. Meanwhile, regarding the palladium salt, reducing agent and complexing agent used in the plating baths, conventionally known compounds were used. Also, the proportion Ni:Pd (molar ratio) in the plating bath obtained by mixing a palladium plating bath and a nickel plating bath was 1.14:1.0.

<Palladium Plating Bath>
Palladium salt: an amount to make the amount of Pd in the palladium plating bath 0.15 wt %
Reducing agent: 1.8 wt %
Complexing agent: 0.63 wt %
Water: 87.2 wt %
pH: 1.8

<Nickel Plating Bath>
Nickel salt (nickel sulfate): 1.8 wt %
Reducing agent (sodium hypophosphite): 2.4 wt %
Complexing agent: 2.4 wt %
Water: 93.2 wt %
pH: 5.2

Next, the base material 11 on which the Ni—Pd—P alloy layer was formed was subjected to an electroless substitution plating treatment using an electroless substitution gold plating bath (manufactured by Okuno Chemical Industries Co., Ltd., FLASH GOLD NC) under the conditions of 70° C. and 2 minutes, and then subjected to an electroless reduction plating treatment using an electroless reduction plating bath (manufactured by Okuno Chemical Industries Co., Ltd., SELF GOLD OTK) under the conditions of 60° C. and 2 minutes, thereby to form a gold plated layer 13 having a thickness of 20 nm on the Ni—Pd—P alloy layer to obtain a surface-treated base material 10.

Next, by immersing the obtained surface-treated base material 10 into a protective film forming agent diluted by 10% with water under the conditions of 50° C. and 1 minute, a protective film 14 was formed on the surface-treated base material 10, followed by washing the surface-treated base material 10 with water.

Next, by immersing the surface-treated base material 10 on which the protective film 14 was formed into a sulfuric acid aqueous solution having a concentration of 0.049 wt % (pH 2) under the conditions of 90° C. and 24 hours to subject the surface-treated base material 10 to an acid treatment, a passivation film 111 (film formed by connection of oxygen with Cr contained in stainless steel) was formed on the base material 11 of the surface-treated base material 10, followed by washing the surface-treated base material 10 with water.

Evaluation of Corrosion Resistance

Figure 10:
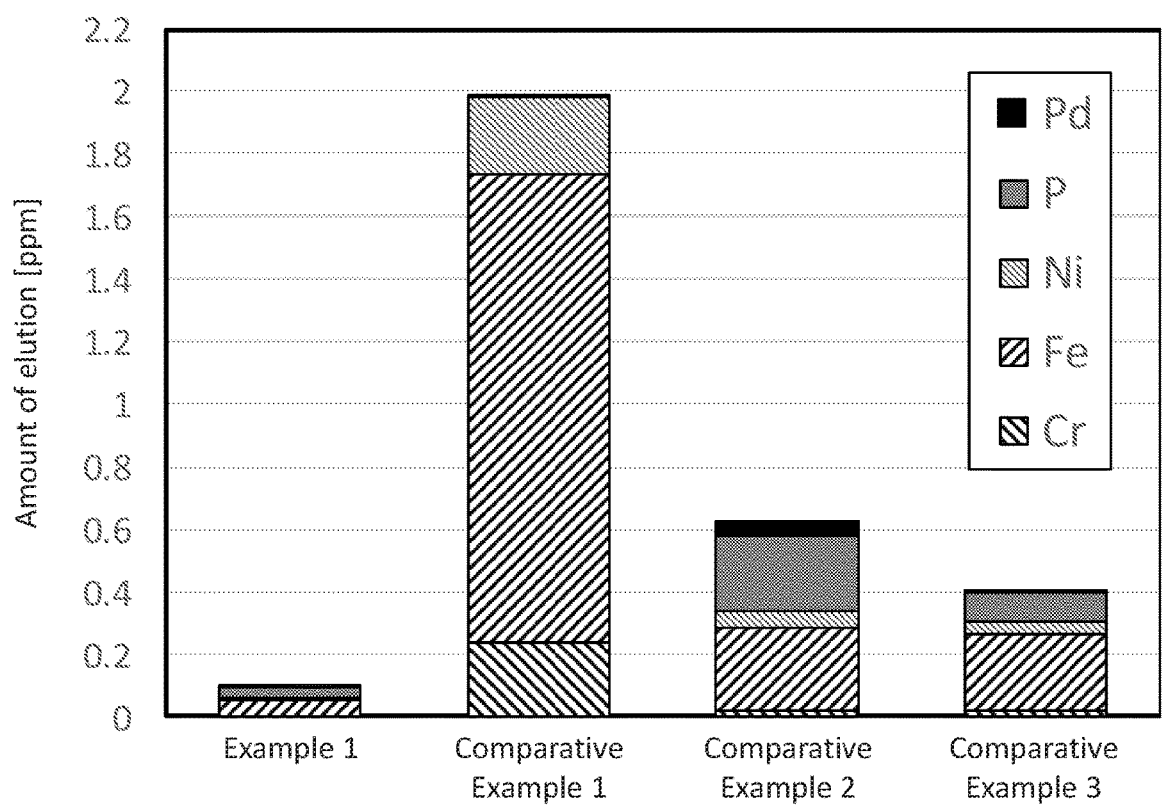
FIG. 10 is a graph illustrating the results of evaluating the corrosion resistances of conducting members for fuel cells of Examples and Comparative Examples.

Next, the corrosion resistance of the surface-treated base material 10 was evaluated. Specifically, the evaluation of corrosion resistance was performed through: masking an end face of the surface-treated base material 10 with a polyimide tape to expose a surface area of 35 mm longitudinal and 30 mm lateral to two sides; immersing the surface-treated base material 10 into a sulfuric acid aqueous solution of 90° C. (volume: 80 ml, pH: 2) for 100 hours; thereafter taking out the surface-treated base material 10; and measuring concentrations of ions (Ni, Pd and P) eluted from the surface-treated base material 10 into the sulfuric acid aqueous solution using an ICP (manufactured by SHIMADZU CORPORATION, ICPE-9000). Results are shown in FIG. 10 and Table 1.

SUS316L worked into a size of a width of 20 mm, a length of 20 mm, and a thickness of 0.1 mm. Results are shown in FIG. 10 and Tables 1 and 2.

Comparative Example 1

A surface-treated base material 10 was produced in the same manner as in Example 1 except that a treatment using a protective film forming agent and an acid treatment were not performed, and the evaluation of corrosion resistance was similarly performed. Results are shown in Table 1.

Comparative Example 2

A surface-treated base material 10 was produced in the same manner as in Example 1 except that an acid treatment was not performed, and the evaluation of corrosion resistance was similarly performed. Results are shown in Table 1.

TABLE 1

|  | Layer configuration | Treatment using protective film forming agent | Acid treatment | Amount of elution [ppm] | | | | | |
|---|---|---|---|---|---|---|---|---|---|
|  |  |  |  | Cr | Fe | Ni | P | Pd | Ti |
| Example 1 | SUS316L/Ni—Pd—P/Au | Yes | Yes | 0.0043 | 0.0509 | 0.0035 | 0.0318 | 0.0036 | 0 |
| Reference Example 1 (SUS316L) | SUS316L | " | " | 0.24 | 1.50 | 0.24 | 0.01 | 0 | 0 |
| Comparative Example 1 | SUS316L/Ni—Pd—P/Au | " | " | 0.0224 | 0.263 | 0.0543 | 0.239 | 0.0499 | 0 |
| Comparative Example 2 | SUS316L/Ni—Pd—P/Au | Yes | " | 0.0224 | 0.247 | 0.0349 | 0.0939 | 0.0019 | 0 |

Measurement of Electrical Resistance

Figure 11:
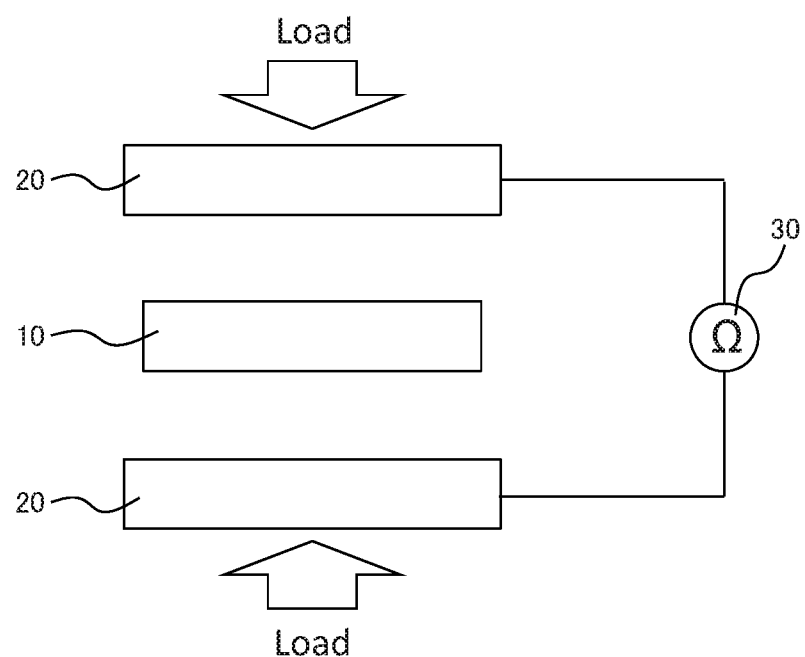
FIG. 11 illustrates a method of measuring the electrical resistances of the conducting members for fuel cells of Examples and Comparative Examples.

Next, the surface-treated base material 10 obtained in Example 1 was used to form a measurement system as illustrated in FIG. 11, and the electrical resistance of the surface-treated base material 10 was measured under the following condition. The measurement system illustrated in FIG. 11 includes the surface-treated base material 10 as a test piece, a gold plate coated copper electrode 20, and an ohm meter 30. Specifically, at the time of measurement of the electrical resistance, the surface-treated base material 10 was first worked into a size of a width of 20 mm, a length of 20 mm and a thickness of 0.1 mm to obtain a test piece. The test piece was fixed by being interposed between the gold plate coated copper electrodes 20 as illustrated in FIG. 11, and the measurement system was thus formed as illustrated in FIG. 11. Next, the electrical resistance values between the gold plate coated copper electrodes 20 sandwiching the test piece were measured using an ohm meter (manufactured by HIOKI E.E. CORPORATION, Milli-Ohm HiTESTER 3540) while applying a load of 1 MPa to the copper electrodes 20. The electrical resistance value exhibits the conductivity of the test piece itself. The obtained measurement results are shown in Table 2.

Reference Example 1

A stainless steel material (SUS316L) used in Example 1 described above was prepared, and the above-described evaluation of corrosion resistance and measurement of electrical resistance were performed for the stainless steel material as it is without forming an alloy plating layer 12 and a gold plated layer 13 on the stainless steel material. The evaluation of corrosion resistance was performed for SUS316L masked with a polyimide tape to expose a surface area of 50 mm longitudinal and 60 mm lateral. The measurement of electrical resistance was performed for

TABLE 2

|  | Electrical resistance [mΩ/cm$^2$] |
|---|---|
| Example 1 | 3 or less |
| Reference Example 1 (SUS316L) | 10 or more |

According to the results of FIG. 10 and Table 1, in Example 1 in which the surface-treated base material 10 obtained by forming the alloy plating layer 12 and the gold plated layer 13 on the base material 11 was subjected to the treatment using the protective film forming agent and the acid treatment, the amounts of elution of respective elements in the evaluation of corrosion resistance were few, which provided excellent corrosion resistance. Furthermore, according to the results of Table 2, in Example 1, even in a case in which the gold plated layer 13 was formed on the surface-treated base material 10, and the surface-treated base material 10 was subjected to the treatment using the protective film forming agent, the electrical resistance value was low, which provided excellent conductivity.

To this end, according to the results of FIG. 10 and Table 1, in Reference Example 1 (SUS316L) in which the alloy plating layer 12 and the gold plated layer 13 were not formed, Comparative Example 1 in which the treatment using the protective film forming agent and the acid treatment were not performed, and Comparative Example 2 in which the acid treatment was not performed, the amounts of elution of respective elements were more compared to Example 1, which provided poorer corrosion resistance. Furthermore, according to the results of Table 2, Reference Example 1 (SUS316L) had a higher electrical resistance value, which provided poorer conductivity.

Reference Example 2

The stainless steel material (SUS316L) used in Example 1 described above was prepared. The stainless steel material was immersed into a sulfuric acid aqueous solution of 0.049 wt % (pH 2) under the conditions of 90° C. for 24 hours to subject the stainless steel material to an acid treatment, thereby to form a passivation film 111 on the surface of the stainless steel material, followed by washing the stainless steel material with water.

XPS Measurement

An X-ray photoelectron spectrometer (manufactured by ULVAC-PHI, Inc., product No.: VersaProbe II) was used for the surface of a passivation film 111 formed on the surface of a stainless steel sheet to measure respective peaks of Fe2p and Cr2p. The intensity of each the obtained peaks was obtained from the areas of the peaks. Results are shown in Table 3. In Table 3, the intensity of each peak was obtained so that the total of the intensity of the peak of Fe2p and the intensity of the peak of Cr2p was 100.

AES Measurement

A scan type Auger electron spectroscopy analyzer (AES) (manufactured by JEOL, Ltd., product No.: JAMP-9500F) was used for the surface of the passivation film 111 formed on the stainless steel plate to measure the atomic percentages of Fe and Cr. Based on the obtained results, the Cr/Fe value (at % of Cr/at % of Fe) was obtained. Results are shown in Table 4.

Reference Example 3

The same stainless steel material (SUS316L) as that of Reference Example 2 described above was prepared. The XPS measurement and AES measurement described above were performed for the stainless steel material as it is without subjecting the stainless steel material to an acid treatment. Results are shown in Tables 3 and 4.

TABLE 3

| | Layer configuration | Acid treatment conditions | Fe(2p$_{3/2}$) | Cr(2p$_{3/2}$) |
|---|---|---|---|---|
| Reference Example 2 | SUS316L | Immersion in sulfuric acid aqueous solution (pH 2, 90° C.) for 24 hours | 22.3 | 77.7 |
| Reference Example 3 | SUS316L | Untreated | 91.6 | 8.4 |

TABLE 4

| | Layer configuration | Acid treatment conditions | Cr/Fe |
|---|---|---|---|
| Reference Example 2 | SUS316L | Immersion in sulfuric acid aqueous solution (pH 2, 90° C.) for 24 hours | 2.1559 |
| Reference Example 3 | SUS316L | Untreated | 1.4291 |

According to the results of Tables 3 and 4, in Reference Example 2 in which the stainless steel material (SUS316L) was subjected to the acid treatment, the Cr ratio in the surface was high, and the passivation film 111 (film formed by connection of oxygen with Cr contained in stainless steel) was satisfactorily formed on the surface of the stainless steel material. Thereby, it was considered that, even if pinholes or the like occurred in the alloy plating layer 12 also in Example 1 described above to cause a part of the alloy plating layer 12 to be exposed, the passivation film 111 was suitably formed on the exposed portion.

To this end, according to the results of Tables 3 and 4, in Reference Example 3 in which the stainless steel material (SUS316L) was not subjected to the acid treatment, the Cr ratio in the surface was low, which caused the passivation film 111 to be hardly formed on the surface of the stainless steel material.

Example 2

A surface-treated base material 10 was produced in the same manner as in Example 1 described above except that an acid treatment was performed by immersion using a sulfuric acid aqueous solution having a concentration of 1 wt % under the conditions of pH of 1 or less, 70° C., and 2 minutes. The presence or absence of the peeling of the gold plated layer 13 was visually confirmed for the produced surface-treated base material 10. Results are shown in Table 5.

Example 3

A surface-treated base material 10 was produced in the same manner as in Example 2 described above except that an acid treatment was performed by immersion using a nitric acid aqueous solution having a concentration of 1 wt % under the conditions of pH of 1, 70° C., and 2 minutes, and similarly evaluated. Results are shown in Table 5.

Comparative Example 3

A surface-treated base material 10 was produced in the same manner as in Example 2 described above except that a treatment using a protective film forming agent was not performed, and similarly evaluated. Results are shown in Table 5.

Comparative Example 4

A surface-treated base material 10 was produced in the same manner as in Example 3 described above except that a treatment using a protective film forming agent was not performed, and similarly evaluated. Results are shown in Table 5.

TABLE 5

| | Layer configuration | Treatment using protective film forming agent | Acid treatment conditions | Peeling of gold plated layer 13 |
|---|---|---|---|---|
| Example 2 | SUS316L/Ni—Pd—P/Au | Yes | Immersion in sulfuric acid aqueous solution (1 wt %, 70° C.) for 2 minutes | No |

TABLE 5-continued

| | Layer configuration | Treatment using protective film forming agent | Acid treatment conditions | Peeling of gold plated layer 13 |
|---|---|---|---|---|
| Example 3 | | Yes | Immersion in nitric acid aqueous solution (1 wt %, 70° C.) for 2 minutes | No |
| Comparative Example 3 | | — | Immersion in sulfuric acid aqueous solution (1 wt %, 70° C.) for 2 minutes | Yes |
| Comparative Example 4 | | — | Immersion in nitric acid aqueous solution (1 wt %, 70° C.) for 2 minutes | Yes |

According to the results of Table 5, in Examples 2 and 3 in which the treatment using the protective film forming agent was performed and the acid treatment was then performed, the gold plated layer 13 was not peeled also by means of the acid treatment. That is, in Examples 2 and 3, the protective film 14 was suitably formed on the alloy plating layer 12 by performing the treatment using the protective film forming agent, so that the elution of the alloy plating layer 12 was suppressed also by means of the acid treatment, which prevented the peeling of the gold plated layer 13.

To this end, according to the results of Table 5, in Comparative Examples 3 and 4 in which the acid treatment was performed without performing the treatment using the protective film forming agent and with performing the acid treatment, the gold plated layer 13 was peeled by means of the acid treatment. That is, in Comparative Examples 3 and 4, the treatment using the protective film forming agent was not performed, so that the protective film 14 was not formed on the alloy plating layer 12. Therefore, the alloy plating layer 12 was eluted by means of the acid treatment, which caused the gold plated layer 13 formed on the alloy plating layer 12 to be peeled.

1 . . . Conducting member for fuel cells (separator)
2 . . . Fuel cell
21 . . . Electrolyte membrane
22 . . . Anode
23 . . . Cathode
1A . . . Flow channel for fuel gas
3C . . . Flow channel for oxidizing gas
3 . . . Fuel cell stack
31 . . . Conducting member for fuel cells (current-collecting plate)
10 . . . Surface-treated base material
11 . . . Base material
111 . . . Passivation film
12 . . . Alloy plating layer
13 . . . Gold plated layer
14 . . . Protective film

The invention claimed is:

1. A conducting member for fuel cells comprising
a surface-treated base material having a base material;
at least one alloy plating layer formed on the base material; and
a gold plated layer provided on the alloy plating layer,
wherein the alloy plating layer has a protective film, which covers at least a part of a portion in which the alloy plating layer is exposed,
the base material has a passivation film formed by an acid treatment on at least a part of a portion in which the base material is exposed, the acid treatment being performed in a state where the alloy plating layer is protected by the protective film,
the protective film contains a mixture of a compound having a thiol group and an azole-based compound, and/or an azole-based compound having a thiol group, and
the alloy plating layer includes Ni.

2. The conducting member for fuel cells according to claim 1, wherein the acid treatment is a treatment using sulfuric acid or nitric acid.

3. The conducting member for fuel cells according to claim 1, wherein the alloy plating layer is made of an alloy selected from Ni—Pd—P, Ni—P, and Ni—Sn alloys.

4. The conducting member for fuel cells according to claim 3, wherein a molar ratio of Ni to Pd (Ni/Pd) in the alloy plating layer is 0.005 to 0.5.

5. The conducting member for fuel cells according to claim 1, further comprising a modifying layer formed between the base material and the alloy plating layer.

6. The conducting member for fuel cells according to claim 1, wherein the base material is selected from stainless steel, Ti and Ti alloy.

7. The conducting member for fuel cells according to claim 1, wherein the conducting member for fuel cells is a separator for fuel cells, or a current-collecting plate for fuel cells.

8. A fuel cell comprising the conducting member for fuel cells according to claim 1.

9. A fuel cell stack obtained by stacking a plurality of fuel cells according to claim 8.

10. The conducting member for fuel cells according to claim 1, wherein the protective film is not formed on a surface of the gold plated layer.

* * * * *